United States Patent [19]

Maegawa et al.

[11] Patent Number: 5,256,850
[45] Date of Patent: Oct. 26, 1993

[54] AZIMUTH ADJUSTING METHOD FOR MAGNETIC HEAD

[75] Inventors: Takaaki Maegawa, Neyagawa; Akio Murata, Ibaraki; Hideaki Mukae, Sanda; Masaru Higashionji, Katano, all of Japan

[73] Assignee: Matsushita Electric Industrial Co., Ltd., Osaka, Japan

[21] Appl. No.: 947,770

[22] Filed: Sep. 18, 1992

[30] Foreign Application Priority Data

Sep. 18, 1991 [JP] Japan .................................. 3-237670

[51] Int. Cl.⁵ .................................. B23K 26/00
[52] U.S. Cl. .......................... 219/121.69; 219/121.85
[58] Field of Search ....................... 219/121.68, 121.69, 219/121.85

[56] References Cited

U.S. PATENT DOCUMENTS

| | | | |
|---|---|---|---|
| 4,017,965 | 4/1977 | Brutsch et al. | 29/603 |
| 4,100,584 | 7/1978 | Behr et al. | 360/125 |
| 4,301,353 | 11/1981 | Suenaga et al. | 219/121.69 |
| 4,329,723 | 5/1982 | Schoenmaker | 360/109 |
| 4,589,040 | 5/1986 | Kawase | 360/109 |
| 4,599,667 | 7/1986 | Van Blerk | 360/109 X |

FOREIGN PATENT DOCUMENTS 62-93028  4/1987  Japan .
62-134118 6/1987  Japan .

*Primary Examiner*—C. L. Albritton
*Attorney, Agent, or Firm*—Ratner & Prestia

[57] ABSTRACT

An azimuth adjusting method for a magnetic head, which includes the steps of forming first and second depressions respectively on a main surface and a reverse surface of the main surface of a magnetic head base for a magnetic head including a magnetic head chip and the magnetic head base so as to reduce thickness of the magnetic head base, projecting heat rays to the first depression to obtain a displacement in a direction opposite to the projecting direction, also projecting the heat rays to a flat plane portion at a bottom of the second depression which is laterally neighboring the first depression so as to effect the azimuth adjustment of the magnetic head, with a reduced thickness of the magnetic head base in a direction of depth for the projection of heat rays due to formation of the depression at the reverse face side of the projection, and also effecting the azimuth angle adjustment in the reverse direction by laterally exchanging the first and second depressions for the projection of heat rays.

2 Claims, 3 Drawing Sheets

AZIMUTH ADJUSTING METHOD FOR MAGNETIC HEAD

BACKGROUND OF THE INVENTION

1. Field of the Invention

The present invention relates to a magnetic recording and reproducing apparatus for use in a video tape recorder (or VTR) or the like.

With respect to an azimuth adjustment of a magnetic head, a specified azimuth angle is prepared during manufacture of the magnetic head gap so as to be merely placed on the magnetic head, while, in the cutting of the magnetic head chip, it is very difficult to achieve accuracy in cutting angles in the order of several minutes. Furthermore, when the magnetic head base on which the magnetic head chip is mounted is deformed by mechanical vibrations or temperature variations, the attaching azimuth angle is also subjected to variations, and the accuracy at the initial stage can not be maintained. Additionally, there may arise such a problem that, if reproduction is effected by another VHS video tape recorder, with the azimuth angle of the magnetic head of a VHS video tape recorder remaining to be deviated, the output is undesirably lowered due to difference in the azimuth angles.

On the other hand, as shown in FIG. 5, there is a contact type azimuth angle adjusting method which is arranged to give strain to a magnetic head base 11 with a head chip 10 of a magnetic head including upper and lower cylinders 2 and 3, by pressing a setting screw 1 against the magnetic head base 11 as in the video tape recorder of M2 mainly utilized for broadcasting purpose. However, in the above conventional arrangement, there are many factors for generating vibrations such as the rotation of the cylinder, tape transportation, etc., while deviation in the azimuth angle due to variations with time by the heat generated from such driving system, or variations in temperature arising from change in working circumstances, etc. can not be avoided.

Currently, in order to minimize the influence from such factors, a screw loosening prevention agent (i.e. resin which solidifies in normal temperature) is used with respect to the setting screw, but its effect is not sufficient, and the height of the magnetic head is altered in the order of several microns, with a consequent variations in the azimuth angle. Accordingly, there has been required a non-contact type azimuth adjustment of magnetic heads for solving the problems as described above.

Meanwhile, as examples of processing by the heat of laser, there was disclosed in a magazine "Machine and tool" published by Kogyo Chosakai, July 1987 a report entitled "Laser forming" by Y. Namba, which describes a processing method for bending a stainless steel flat plate material into a loop shape after irradiation of laser. Furthermore, there has been another report in chapter 3 of "welding engineering" related to "welding stress and welding deformation" (published by Rikogakusha, 1979, ISBN4-8445-2108-X) by K. Sato, Y. Mukai, and M. Toyota.

2. Description of the Prior Art

SUMMARY OF THE INVENTION

Accordingly, an essential object of the present invention is to provide an azimuth adjusting method for a magnetic head which can readily adjust an azimuth angle, without deviation in the azimuth angle, with substantial elimination of disadvantages in the conventional methods of this kind.

Another object of the present invention is to provide an azimuth adjusting method as described above, which is simple in processing and can be readily introduced into manufacturing process of magnetic heads.

In accomplishing these and other objects, according to the present invention, the magnetic head base is irradiated through utilization of heat rays of laser to apply strain to the head base, thereby effecting the azimuth adjustment of the magnetic head by a non-contact practice.

More specifically, according to one preferred embodiment of the present invention, there is provided an azimuth adjusting method for a magnetic head, which includes the steps of forming first and second depressions or bores respectively on a main surface and a reverse surface of said main surface, of a magnetic head base for a magnetic head including a magnetic head chip and the magnetic head base so as to reduce thickness of said magnetic head base thereat, projecting heat rays to the first depression to obtain a displacement in a direction opposite to the projecting direction, also projecting the heat rays to a flat plane portion at a bottom of the second depression which is laterally neighboring said first depression, thereby to effect the azimuth adjustment of the magnetic head, with a reduced thickness of the magnetic head base in a direction of depth for the projection of heat rays due to formation of the depression at the reverse face side of the projection of heat rays, and also effecting the azimuth angle adjustment in the reverse direction by laterally exchanging said first and second depressions for the projection of heat rays. The depth of each depression is set to be more than half the thickness of the magnetic head base.

By the process according to the present invention as described above, an improved azimuth adjusting method for the magnetic head has been advantageously provided through simple procedures.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
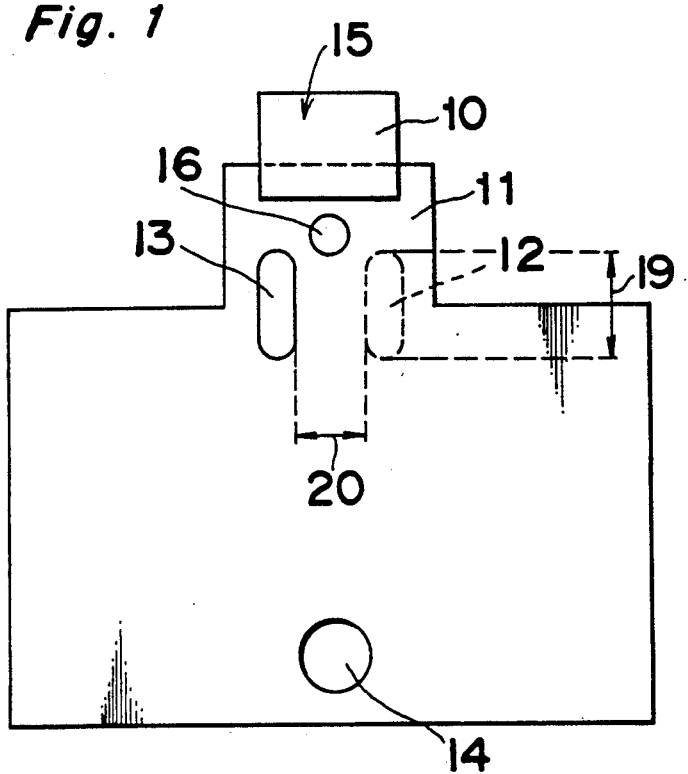
FIG. 1 is a schematic top plan view of a magnetic head according to one preferred embodiment of the present invention.

Before the description of the present invention proceeds, it is to be noted that like parts are designated by like reference numerals throughout the accompanying drawings.

Figure 2:
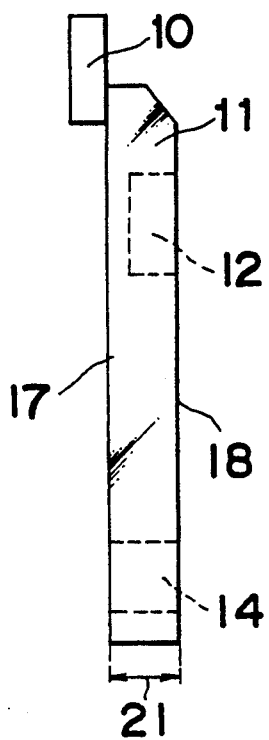
FIG. 2 is a sectional view of the magnetic head of FIG. I.
Figure 3:
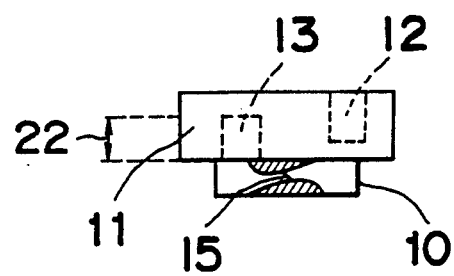
FIG. 3 is a fragmentary front side view of the magnetic head of FIG. 1 as observed from a sliding surface thereof.

Referring now to the drawings, there is shown in FIGS. 1 to 3, a magnetic head to which an azimuth adjusting method of the present invention may be applied, which generally includes a magnetic head base 11 and a magnetic head chip 10 attached to said magnetic head base 11. Here, it is so arranged to adjust the azimuth of the magnetic head by applying strain to the magnetic head base 11 in a non-contact practice, for example, by irradiating heat rays of laser onto the head base 11 at a position between a winding hole 16 for passing a magnetic head winding therethrough and a threaded hole 14 for fixing the magnetic head base 11 to a cylinder (not shown here). In this case, YAG laser which is an irradiating heat source having an output of 300 W, and converged to 600 μm in diameter of the laser beam at pulse width 9 milli-sec. is projected onto the magnetic head base 11. The irradiation of the laser is effected from the magnetic head main surface side 17.

Depressions i.e. bores at irradiating positions for projecting laser beam thereinto are formed in the magnetic head base 11, for example, of a brass material. The brass material is composed of 39% of zinc and remaining 61% of copper, and is annealed for one hour at 290° C. for removing processing strain during manufacture thereof. Each of the depressions is located at position of 3 to 6 milli-meters from a forward edge of a magnetic head gap 15, and 3 milli-meters in length 19, 1 milli-meter in width, 0.9 milli-meter in depth, with a thickness 21 of the magnetic head base 11 set at 1.5 milli-meters. Two depressions are formed in one magnetic head base 11.

The depression at the right side is shown as a right side irradiating position 12, and that at the left side is denoted as a left side irradiating position 13 in FIG. 1. It is to be noted here that the depression for the left side irradiating position 13 is formed on the main surface 17 of the magnetic head base 11, while the depression for the right side irradiating position 12 is provided on the reverse surface 18 of the main surface 17 of said magnetic head base 11. The interval 20 between the depressions is set at 2 milli-meters. The irradiating position of laser is set at 4.5 milli-meters from the forward edge of the magnetic head gap 15, and at a center portion in the width of the depression in order to irradiate the center thereof. When the laser beam is projected for one pulse to the left side irradiating position 13 at the depression of the magnetic head base 11, i.e. to the side of the main surface 17 of said magnetic head base 11, the magnetic head chip 10 is subjected to displacement in a direction opposite to that from which the laser beam is projected. In other words, the magnetic head is subjected to the displacement with respect to the head height in the direction opposite to the irradiating direction by projecting laser beam into the depression.

Moreover, when the depth of the left side irradiating position 13 which is the depression for irradiation is more than half the thickness of said magnetic head base 11, a large displacement can be obtained. In the case where the thickness 21 of the head base 11 is 1.5 milli-meters, the dependency between the depth of the depression and the direction of the magnetic head height when the laser with the same energy as above is projected with the same dimensions of the depression, is such that up to 0.75 milli-meter in the depth of the depression, the displacement of the magnetic head height in the direction of laser irradiation can be obtained. Meanwhile, when the depth exceeds 0.75 milli-meter, the displacement is in the opposite direction to the irradiating direction, which is in the reverse direction to the above. Subsequently, the laser beam having high irradiating energy which will leave a trace of irradiation in the depression 13 is projected, while the laser beam is also projected onto the right side irradiating position 12, which is another irradiating depression neighboring the left side irradiating position 13 (i.e. the depression 13). It is to be noted that the irradiation of the laser beam onto the right side irradiating position 12 is effected from the same direction as that in the left side irradiating position 13. Although the above case relates to a flat face, in the direction of thickness, since the bore is formed at the reverse face side 18 of the magnetic head main surface 17, the result is equal to that when a thin base is subjected to irradiation, within the irradiating region. In the above case, if the left side irradiating position 13 and the right side irradiating position 12 are irradiated from the same direction, displacement takes place in the azimuth direction of the magnetic head gap 15, since the direction of displacement at the left side irradiating position 13 is opposite to that at the right side irradiating position 12. By projecting energy each equivalent to one pulse of the laser energy referred to earlier onto the left side irradiating position 13 and then, to the right side irradiating position 12, displacement by one degree was obtained in the azimuth angle direction.

Figure 4:
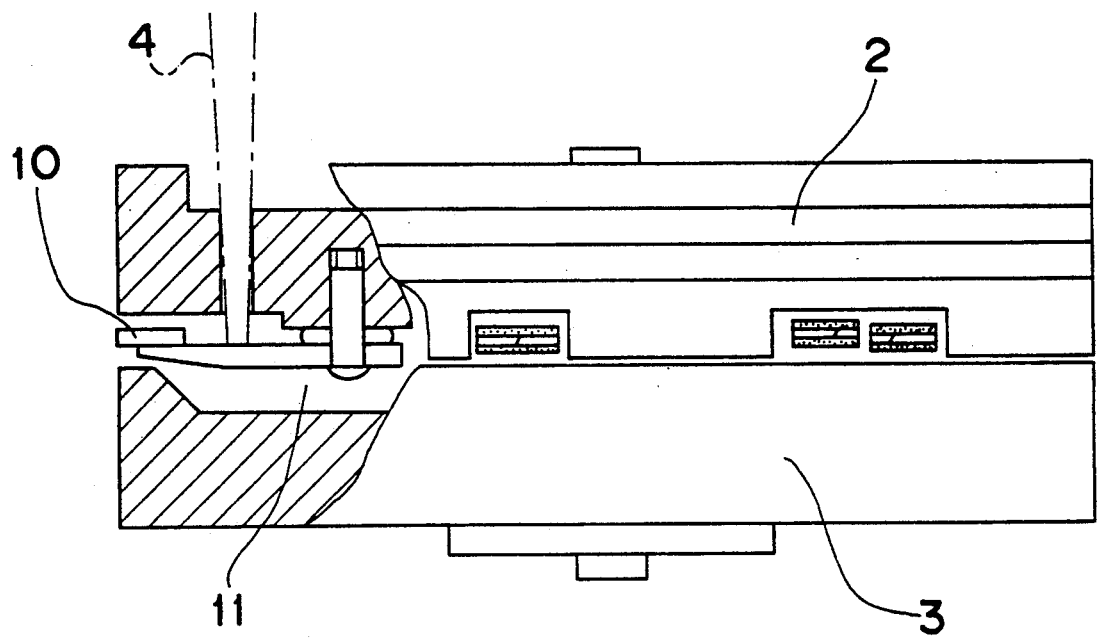
FIG. 4 is sectional view, partly broken away, in a state where a magnetic head is mounted on an upper cylinder for explaining a height adjustment of a magnetic head by laser.
Figure 5:
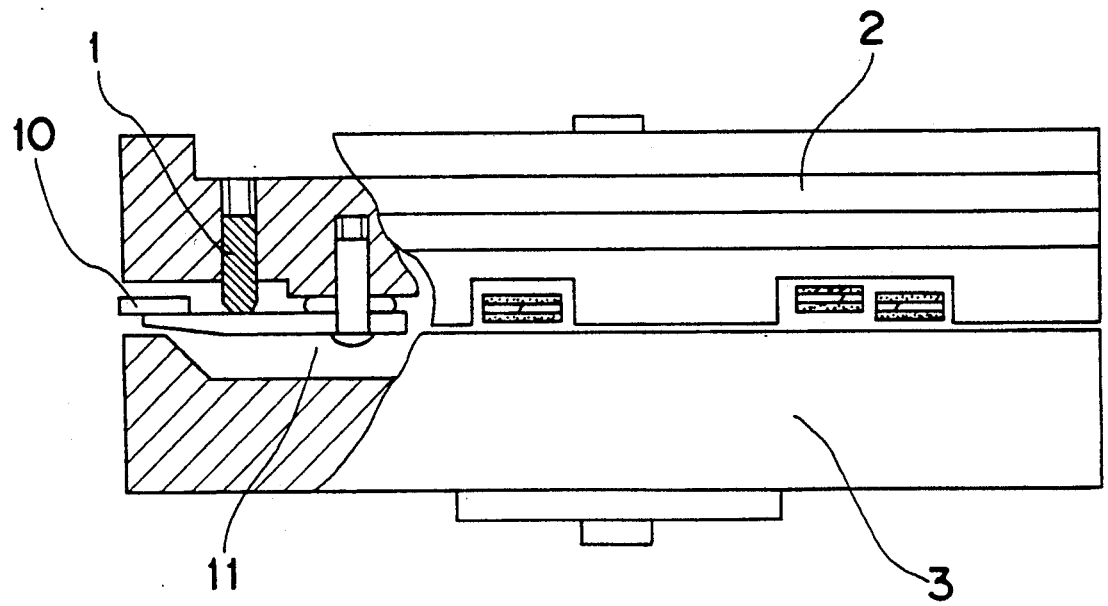
FIG. 5 is a view similar to FIG. 4, which particularly relates to a conventional arrangement in which a known set screw is employed for a height adjustment of the magnetic head.

FIG. 4 shows the state of irradiation of the laser light 4 in the case where the magnetic head is attached to the upper cylinder 2.

Figure 6:
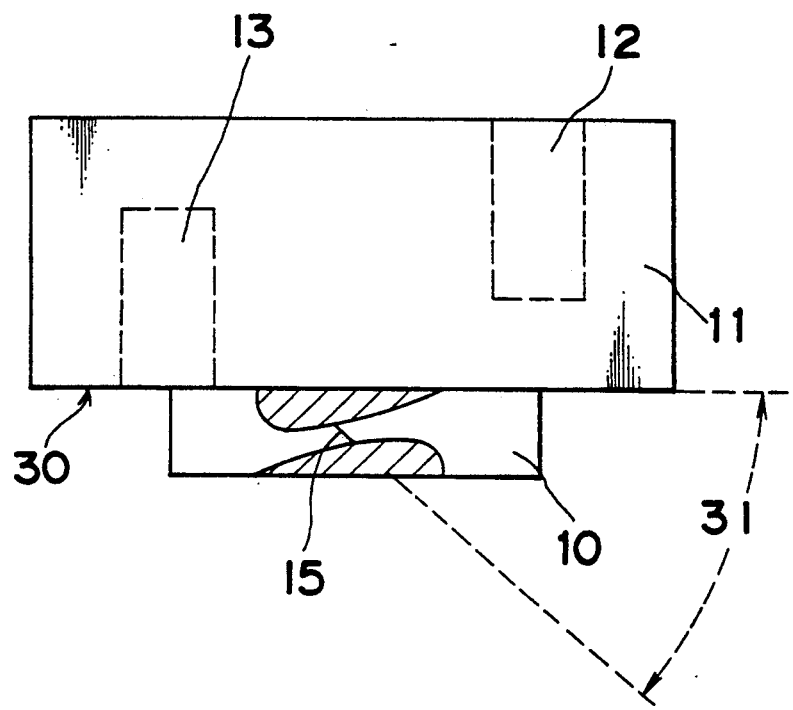
FIG. 6 is a view at the sliding surface of the magnetic head in FIG. 3 before irradiation of laser for explaining an azimuth adjustment of the magnetic head.
Figure 7:
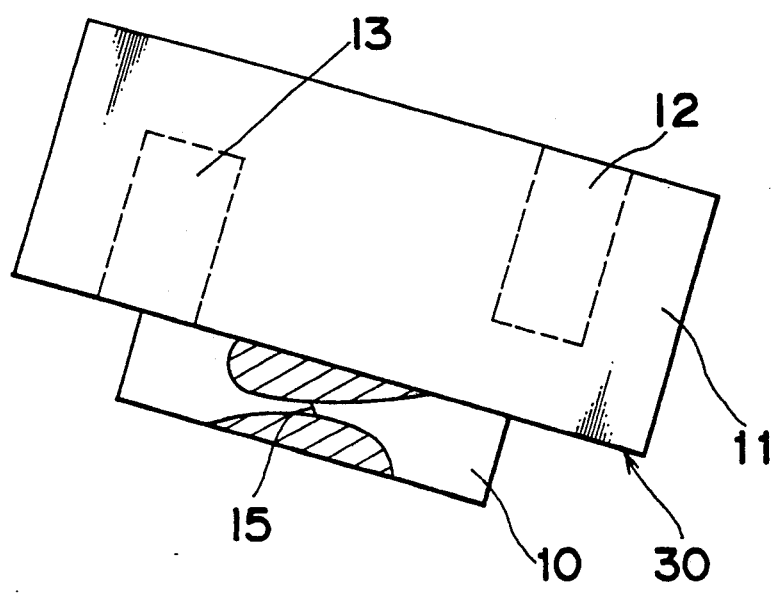
FIG. 7 is the view similar to FIG. 6 which particularly shows the state after irradiation of the laser.

The state of FIG. 3 is shown on an enlarged scale from the sliding face side of the magnetic head as illustrated in FIG. 6. With reference to FIGS. 6 and 7, there will be considered a case where the laser energy as described earlier is projected by one pulse to the left side irradiating position 13 or the right side irradiating position 12 from the side of the magnetic head chip 10. FIG. 6 shows the state before the irradiation, and FIG. 7 represents the state after the irradiation.

Here, the reference surface of the azimuth angle is set to be a fixing surface 30 for the head chip 10, and the angle between the head gap 15 and the head chip fixing surface 30 is regarded as the azimuth angle 31.

Specifically, the laser beam is first projected to the left side irradiating position 13 which is the depression position formed for irradiation. Since the depression 13 extends into the magnetic head base 11 up to a portion exceeding half of a thickness of said head base, the entire portion in the direction of thickness within the irradiating region is to be subjected to the displacement. Moreover, the strain obtained here is suppressed at a peripheral portion of the bore, and finally, the magnetic head is subjected to the displacement in a direction opposite to the irradiated side.

Subsequently, upon irradiation to the right side irradiating position 12 in the same direction, since the bore is formed in the face opposite to the irradiating surface, similar result as in the irradiation onto a thin flat plate is obtained. In this case, the strain causes the displacement in the irradiating side. By the irradiation of the two places as described above, the magnetic head is raised at the left side and lowered at the right side as shown in FIG. 7, and thus, the displacement in the azimuth direction is readily obtained.

On the assumption that, in the azimuth adjustment of the magnetic head through utilization of heat energy of laser beam, even if a target irradiation displacement amount is undesirably exceeded by erroneous over-irradiation, the excessive amount of the azimuth adjustment of the magnetic head may be returned to the normal degree by changing the left and right side irradiating regions through laser irradiation in the same direction via alternation of the irradiating position to irradiate the portion except the depression region of the magnetic head base 11.

Such azimuth adjustment of the magnetic head as described above is possible even for a magnetic head during rotation on a fluid bearing rotary cylinder through synchronization with the rotation and irradiation of laser beam. Moreover, when the laser energy is increased, the azimuth angle direction of the magnetic head may be adjusted in a short period of time in the unit of minute through adjustment of energy for one pulse per one head in the order of several milli-second for one pulse, and thus, fine adjustment at high accuracy can be easily effected by only reducing the irradiating energy amount, even in the unit of minute, which is difficult to be effected by a setting screw. The laser irradiating position in the case where the irradiation to the depression is effected more than two times may be in any position so long as it is within the depression. Similarly, it is possible to effect irradiation to the same position.

The magnetic head adjusted for the azimuth through utilization of the laser energy as described so far is free from variations in the displacing amount by the influence of mechanical vibrations and changes in environmental conditions.

Furthermore, the concept of the magnetic head base 11 of the present invention as described so far may similarly be applied to a magnetic head base in which a plurality of magnetic head chip portions are provided on one magnetic head base by forming a plurality of depressions therein. In this case also, the head azimuth adjusting time can be reduced, or the irradiation energy may reduced.

It should be noted here that, in the foregoing embodiment, although deformation by welding by the irradiation of the laser beam through employment of light energy is utilized, any other method may be used in principle so far as it can effect local heating such as the arc welding, electron beam welding employing electrical energy, ultrasonic welding adopting ultrasonic energy, gas welding utilizing chemical energy, etc.

As is clear from the foregoing description, according to the present invention, high accuracy positional adjustments of magnetic head chips in a state where the plurality of magnetic head chips are mounted on a single magnetic head base, can be made without necessity for final adjustment in the cylinder state or selection of magnetic head chips. Moreover, even in the case where heat irradiation is effected from one direction, displacement in the azimuth direction of the magnetic head may be achieved by projecting heat onto the magnetic head, and even if the displacing amount exceeds the target value, adjustments may be made by irradiating in the reverse direction at the left and right sides. Thus, it has been made possible to reduce the number of parts and rationalize adjusting work, and to achieve cost reduction through improvement of yield, etc., in the manufacturing process of the video tape records at present, and a mass production of video tape recorders at high image quality can be effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An azimuth adjusting method for a magnetic head, which comprises the steps of forming first and second depressions respectively on a main surface and a reverse surface of said main surface of a magnetic head base for a magnetic head including a magnetic head chip and the magnetic head base so as to reduce thickness of said magnetic head base thereat, projecting heat rays to the first depression to obtain a displacement in a direction opposite to the projecting direction, also projecting the heat rays to a flat plane portion at a bottom of the second depression which is laterally neighboring said first depression, thereby to effect the azimuth adjustment of the magnetic head, with a reduced thickness of the magnetic head base in a direction of depth for the projection of heat rays due to formation of the depression at the reverse face side of the projection, and also effecting the azimuth angle adjustment in the reverse direction by laterally exchanging said first and second depressions for the projection of heat rays.

2. An azimuth adjusting method as claimed in claim 1, wherein each of said depressions on the magnetic head base is located at position three to six milli-meters from a forward edge of a magnetic head gap, and is one millimeter in width and more than half the thickness of said magnetic head base in depth, said depressions being formed in two in one magnetic head base, with an interval between said depressions set at two milli-meters, whereby the azimuth adjustment of the magnetic head is effected by projecting laser into both of said depressions for displacement in the azimuth direction of said magnetic head.

* * * * *